US012572105B2

(12) United States Patent
Matsumoto

(10) Patent No.: US 12,572,105 B2
(45) Date of Patent: Mar. 10, 2026

(54) IMAGE FORMING APPARATUS, METHOD FOR CONTROLLING IMAGE FORMING APPARATUS, AND STORAGE MEDIUM

(71) Applicant: CANON KABUSHIKI KAISHA, Tokyo (JP)

(72) Inventor: Hiroshi Matsumoto, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/678,664

(22) Filed: May 30, 2024

(65) Prior Publication Data

US 2024/0402642 A1 Dec. 5, 2024

(30) Foreign Application Priority Data

Jun. 2, 2023 (JP) ................................ 2023-091295

(51) Int. Cl.

| | |
|---|---|
| ***G03G 15/08*** | (2006.01) |
| ***B42C 9/00*** | (2006.01) |
| ***G03G 15/00*** | (2006.01) |

(52) U.S. Cl.

CPC ....... *G03G 15/6585* (2013.01); *B42C 9/0081* (2013.01); *G03G 15/5016* (2013.01); *G03G 15/556* (2013.01); *G03G 2215/00835* (2013.01); *G03G 2215/00936* (2013.01)

(58) Field of Classification Search

CPC ............. G03G 15/5016; G03G 15/556; G03G 15/6585; G03G 15/6573; B42C 9/0081; B65H 37/04

See application file for complete search history.

(56) References Cited

U.S. PATENT DOCUMENTS 7,346,309 B2 * 3/2008 Nakamura ......... G03G 15/6544 399/408
2012/0053868 A1 * 3/2012 Matsumoto ............... G06F 1/28 702/61

FOREIGN PATENT DOCUMENTS

JP 2004209859 A 7/2004

* cited by examiner

*Primary Examiner* — Hoang X Ngo
(74) *Attorney, Agent, or Firm* — Canon U.S.A., Inc. IP Division

(57) ABSTRACT

A method for controlling an image forming apparatus includes performing image formation on a sheet using a recording material, executing sheet processing for binding a plurality of sheets using the recording material, and storing a history of the image formation and a history of the sheet processing.

16 Claims, 13 Drawing Sheets

Z (HEIGHTWISE DIRECTION)
Y-DIRECTION
X (LATERAL DIRECTION)

1168
1169
1167
1171
1170
1169a
1172a, 1172b
S1-S5
1180

S6-S10

IMAGE FORMING APPARATUS, METHOD FOR CONTROLLING IMAGE FORMING APPARATUS, AND STORAGE MEDIUM

BACKGROUND

Field

The present disclosure relates to an image forming apparatus, a method for controlling the image forming apparatus, and a storage medium.

Description of the Related Art

There is a known technique for press-bonding sheets to which a recording material is applied by heating and pressing the portions where the recording material is applied (see Japanese Patent Laid-Open No. 2004-209859).

The press-bonding of sheets requires a recording material for press-bonding in addition to a recording material for use in printing images. Conventionally, it is not easy to know whether the recording material was used more for printed images or press-bonding by checking the history.

SUMMARY

In an aspect of the present disclosure, an image forming apparatus includes an image forming unit configured to perform image formation on a sheet using a recording material, a sheet processing unit configured to execute sheet processing for binding a plurality of sheets using the recording material, and a storing unit configured to store a history of the image formation and a history of the sheet processing.

Further features of the present disclosure will become apparent from the following description of exemplary embodiments with reference to the attached drawings.

DESCRIPTION OF THE EMBODIMENTS

Embodiments of the present disclosure will be described hereinbelow with reference to the drawings. In the present disclosure, "image forming apparatus" includes single-function printers, copying machines, multifunctional peripherals, commercial printers, and other apparatuses for forming (printing) images on recording media. The image forming apparatus may be a system (image forming system) in which an image forming apparatus main body that forms images on recording materials is joined to a sheet processing apparatus, a sheet conveying apparatus, and other apparatuses.

First Embodiment

Figure 1:
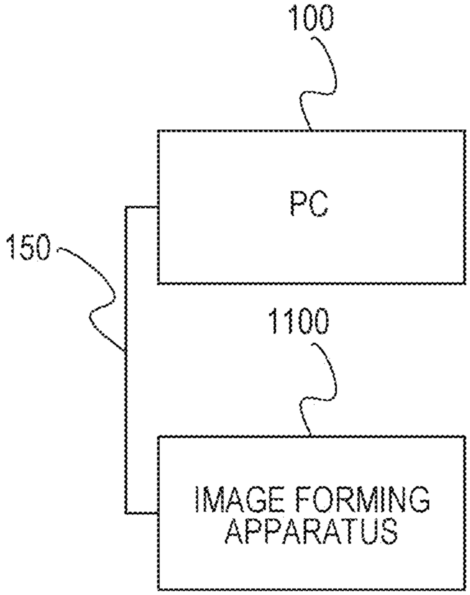
FIG. 1 is a diagram of an image forming apparatus and a personal computer (PC) connected according to a first embodiment.

FIG. 1 is a block diagram of a printing system, which is an example of an image forming system of a first embodiment.

The printing system includes a personal computer (PC) 100 and an image forming apparatus 1100, which are connected using a communication line 150, such as a local area network (LAN) or a universal serial bus (USB).

The PC 100 may be an electronic device, such as a personal digital assistant (PDA) or a mobile phone.

Figure 2A:
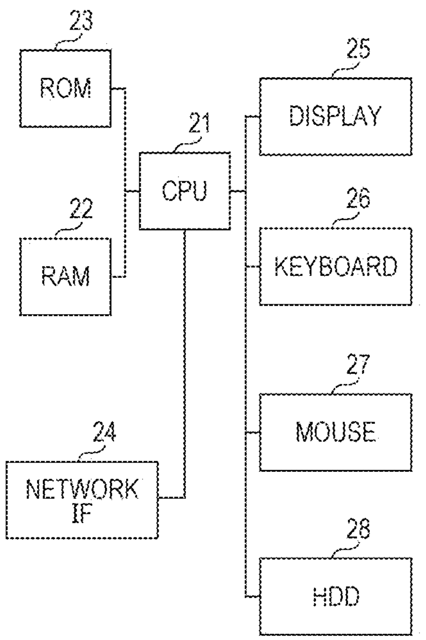
FIG. 2A is a block diagram of a printer driver.

FIG. 2A is a block diagram illustrating the main hardware configuration of the PC 100. The PC 100 includes a central processing unit (CPU) 21, a random access memory (RAM) 22, a read only memory (ROM) 23, a network interface (IF) 24, a display 25, a keyboard 26, a mouse 27, and a hard disk drive (HDD) 28, which are connected via the CPU 21.

The CPU 21 controls the entire PC 100 using programs and data stored in the RAM 22 or the ROM 23.

The RAM 22 has an area for temporarily storing programs and data loaded from the HDD 28. The RAM 22 further has a work area used by the CPU 21 to execute various processes using programs and data received from an external device via the network IF 24.

The ROM 23 stores a boot program and setting data for various hardware devices constituting the PC 100.

The network IF 24 functions as an interface for connecting the PC 100 to the communication line 150, which allows the PC 100 to perform data communication with an external device via the communication line 150. Any type of network IF 24 may be used.

The display 25 connects to a cathode ray tube (CRT) display, a liquid crystal display, or the like and is capable of displaying the processing result of the CPU 21 (for example, a print setting screen, described below) using images or text.

The keyboard 26 and the mouse 27 are typical examples of input devices and function as user interfaces for inputting various instructions to the CPU 21. The types of input devices are not limited to the above examples.

The HDD 28 stores an operating system (OS), a document preparation program, a printer driver, and table data (described below). Any other storage devices capable of storing data, such as a solid-state drive (SSD), may be used.

The PC 100 reads the installed operation system and programs into the RAM 22, produces a document, and when printing the document, sends print information to the image forming apparatus 1100 via the communication line 150 through the printer driver.

Figure 2B:
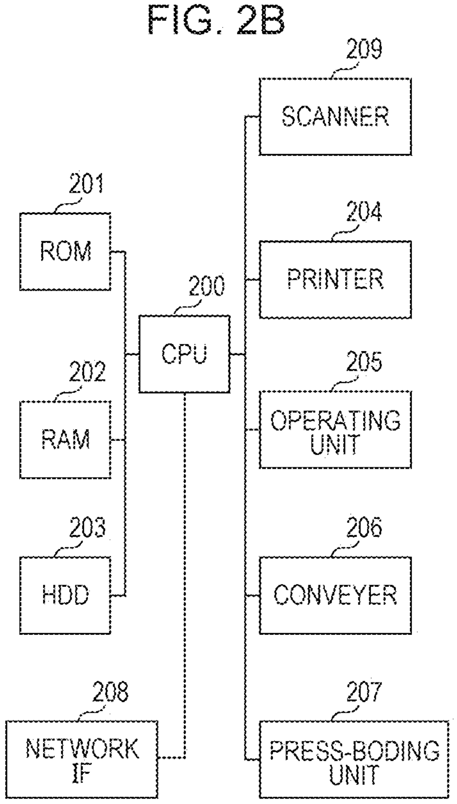
FIG. 2B is a block diagram of the image forming apparatus.

FIG. 2B is diagram illustrating the control configuration of the image forming apparatus 1100.

The image forming apparatus 1100 includes a central processing unit (CPU) 200. The CPU 200 is connected to a ROM 201, a RAM 202, and an HDD 203 via a bus. The CPU 200 executes various programs stored in the ROM 201 to perform an image forming operation.

Various kinds of control data that the CPU 200 uses at the image forming operation are stored in the RAM 202. The image forming apparatus 1100 further includes the HDD 203 to store print data.

A scanner 209 scans document image to generate image data. In response to receiving an image forming request via the network IF 208, the CPU 200 causes a conveyer 206 to convey sheets and controls a printer 204 to cause the printer 204 to print the image on the sheets.

The CPU 200 executes a copy job for causing the printer 204 to perform printing based on the image data generated by scanning the document with the scanner 209.

The CPU 200 controls the loads of the press-bonding unit 207 to cause the press-bonding unit 207 to press the sheet.

Figure 3A:
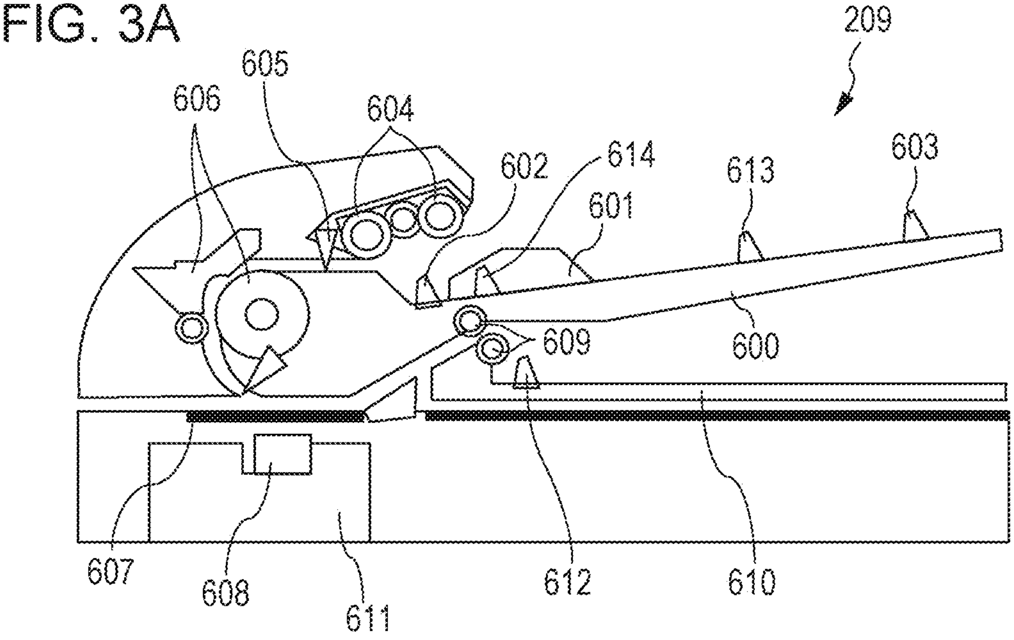
FIG. 3A is a sectional side view of an auto document feeder.

FIG. 3A is a diagram for illustrating the auto document feeder of the scanner 209 of the image forming apparatus 1100. The auto document feeder (ADF) is also referred to as an automatic document conveying apparatus.

FIG. 3A is a sectional side view of the auto document feeder of the scanner 209 illustrating the internal structure. The auto document feeder includes a document tray 600 for loading scan documents. The document tray 600 includes two document guides 601 thereon, a document sensor 602 for detecting whether documents are loaded, and three document-size detection sensors 603, 613, and 614.

The document guides 601 are movable in the direction perpendicular to the document conveying direction. The conveyance of the documents placed on the document tray 600 can be stabilized by the user moving the document guides 601 to the opposite ends of the documents in the main scanning direction. The two document guides 601 are disposed side by side in the lateral direction of the documents (in the direction perpendicular to the document conveying direction). The documents placed in the document tray 600 are conveyed by pickup rollers 604, feed rollers 606, and discharge rollers 609. The pickup rollers 604 are for conveying the documents placed in the document tray 600 into a document conveying path in the auto document feeder. The feed rollers 606 convey the documents conveyed into the document conveying path by the pickup rollers 604. The discharge rollers 609 convey the documents conveyed by the feed rollers 606 to an output tray 610. The output tray 610 is provided with an output-tray document sensor 612 for detecting whether documents are conveyed to the output tray 610. The documents conveyed by the pickup rollers 604 are detected by a document-passage detection sensor 605. The document-passage detection sensor 605 determines whether the first document has passed based on the detection time. All the feed rollers 606, the pickup rollers 604, and the discharge rollers 609 are driven by a stepping motor (not shown). The documents conveyed by the auto document feeder are scanned by a contact image sensor (CIS) 608 provided at a sensor unit 611 through a scanning window 607 of the auto document feeder therebelow. The sensor unit 611 is freely movable in the sub-scanning direction and also in the same direction as the conveying direction of the documents conveyed from the feed rollers 606 toward the discharge rollers 609. The scanning window 607 of the auto document feeder has a certain length in the sub-scanning direction, and the CIS 608 can be moved to any position within the length to scan the documents at the moved position. The CIS 608 is constituted by photoelectric conversion elements, such as charge-coupled devices (CCD), and simultaneously performs First-In First-Out (FIFO) for storing images of the individual elements and signal generation for controlling the FIFO and the CCDs. The CIS 608 is typically realized in the form of multiple photoelectric conversion elements arranged in a row.

Figure 3B:
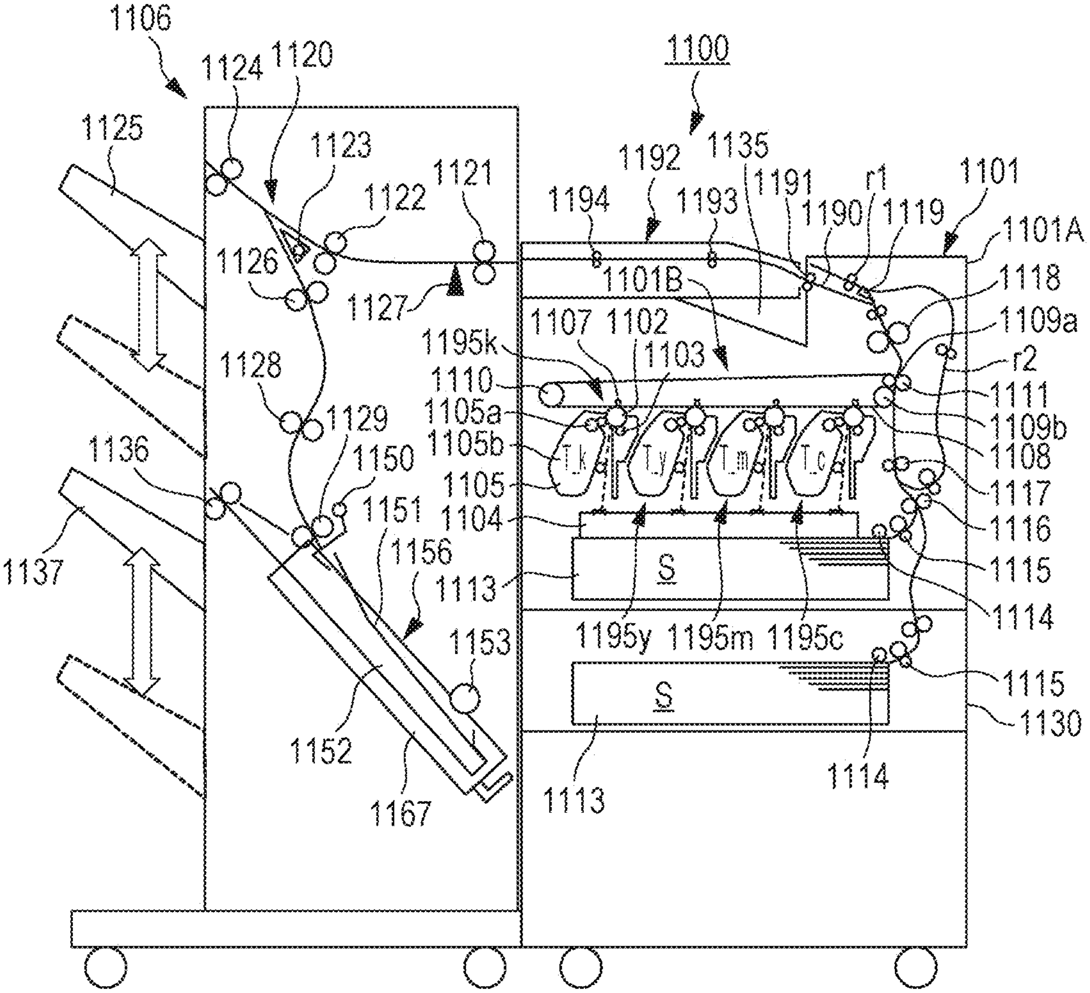
FIG. 3B is a schematic diagram of the printer of the image forming apparatus.

FIG. 3B is a schematic diagram of the printer 204 of the image forming apparatus 1100 according to the first embodiment.

The image forming apparatus 1100 includes a printer body 1101, which is the main body of the image forming apparatus 1100 having an image forming function (printing function), and a sheet processing unit 1106 having a sheet bonding function.

The image forming apparatus 1100 of this embodiment can produce a printed and bound booklet with one apparatus by forming images on each of sheets S with the image forming apparatus body 1101 and thermally bonding the multiple sheets S with the sheet processing unit 1106. Available examples of the sheets S include paper, such as plain paper and heavy paper, surface-treated sheet materials, such as coated paper, plastic films, cloth, specially shaped sheet materials, such as envelopes and index paper, and a variety of sheet materials with different sizes and materials.

Image Forming Apparatus Body

The image forming apparatus body 1101 is an electrophotographic apparatus including a casing 1101A and an electrophotographic image forming unit 1101B housed in the casing 1101A.

The image forming unit 1101B includes an intermediate transfer belt 1108 serving as an intermediate transfer unit, process cartridges disposed along the intermediate transfer belt 1108, a scanner unit 1104 serving as an exposure unit, and primary transfer rollers 1107. The process cartridges are provided for four colors: a yellow process cartridge 1195*y*, a magenta process cartridge 1195*m*, a cyan process cartridge 1195*c*, and a black process cartridge 1195*k*.

The process cartridge 1195*k* creates a single-color image corresponding to the black component of a color image with a black toner Tk. The process cartridge 1195*y* creates a single-color image corresponding to the yellow component of a color image with a yellow toner Ty. The process cartridge 1195*m* creates a single-color image corresponding to the magenta component of a color image with a magenta toner Tm. The process cartridge 1195*c* creates a single-color image corresponding to the cyan component of a color image with a cyan toner Tc.

Each process cartridge 1195 includes a photosensitive drum 1102 serving as an image bearing member, a charging unit 1103 serving as a charging means, and a developing unit 1105 serving as a developing means. Although FIG. 3B illustrates only the structure of the process cartridge 1195*k*, the process cartridge 1195*y*, the process cartridge 1195*m*, and the process cartridge 1195*c* also have the same structure.

The single images created in the process cartridges 1195*y*, 1195*m*, 1195*c*, and 1195*k* are primarily transferred onto the intermediate transfer belt 1108 so as to overlap with one another and are then secondarily transferred to the sheet S at a secondary transfer portion.

The developing unit 1105 includes a developing roller 1105*a* serving as a developing means and a toner container 1105*b* that contains toner (developer). The developing roller 1105*a* is rotatably held by the toner container 1105*b*. Although FIG. 3B illustrates only the developing unit 1105 in the process cartridge 1195*k*, the process cartridge 1195*y*, the process cartridge 1195*m*, and the process cartridge 1195*c* also have the same structure. The process cartridges 1195*y*,

1195*m*, 1195*c*, and 1195*k* are detachable from the casing 1101A. The "casing 1101A" of the printer body 1101 is the portion of the printer body 1101 excluding the process cartridge 1195. The casing 1101A includes a frame member, such as a metal frame constituting the frame of the printer body 1101, and a member fixed to the frame and forms a mount space in which the process cartridges 1195 are mounted.

Figure 6:
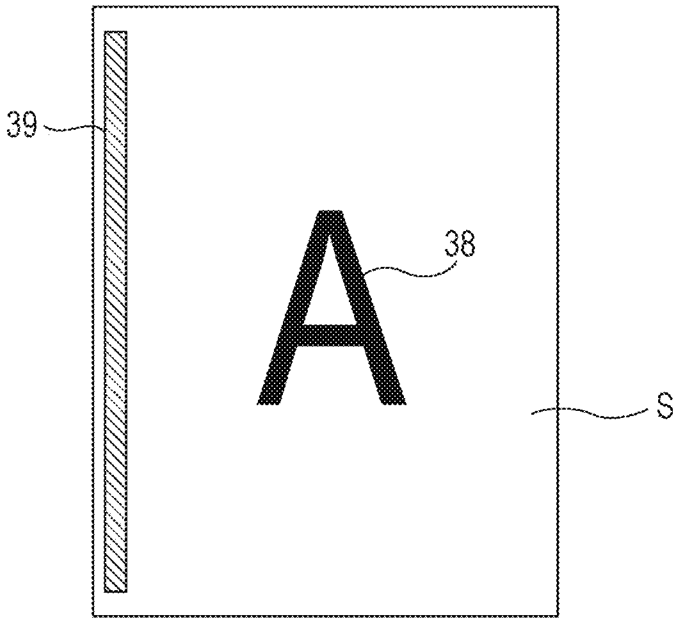
FIG. 6 is a diagram illustrating an example of a toner image formed on a sheet by the image forming apparatus.

The printer body 1101 can use at least one of multiple colors of toner as a toner for boning the sheets S together. For example, the black toner Tk can be used both as a toner for printing images on the sheets S and a bonding toner. In this case, the process cartridge 1195*k* creates a single-color image 38 (print image) corresponding to the black component of the color image and a bonding toner image 39 (bonding image) to be transferred to the sheet bonding area, as illustrated in FIG. 6.

The scanner unit 1104 serving as an exposure means is disposed below the process cartridges 1195 in the casing 1101A. A cassette 1113 (also referred to as a sheet tray or storage) serving as a storage for storing the sheets S for use in image formation is mounted below the scanner unit 1104 so as to be drawn from the casing 1101A. One or more optional sheet feeding units 1130 including an additional cassette 1113 may be joined to the bottom of the casing 1101A.

The intermediate transfer belt 1108 is a movable (rotatable) endless belt stretched round a driving roller 1109*a*, a stretching roller 1109*b*, and a tension roller 1110, which rotate about the axes parallel to one another. The intermediate transfer belt 1108 is moved (rotated and conveyed) counterclockwise in the drawing by the rotation of the driving roller 1109*a*. The primary transfer rollers 1107 serving as primary transfer members are disposed on the inner circumference of the intermediate transfer belt 1108 at positions facing the photosensitive drums 1102 with the intermediate transfer belt 1108 therebetween. A secondary transfer roller 1111 serving as a transfer member (secondary transfer member) is disposed on the outer circumference of the intermediate transfer belt 1108 at a position facing the driving roller 1109*a* with the intermediate transfer belt 1108 therebetween. The secondary transfer portion serving as a transfer portion is formed as a nip portion between the intermediate transfer belt 1108 and the secondary transfer roller 1111. The intermediate transfer belt 1108, the primary transfer roller 1107, and the secondary transfer roller 1111 constitute a transfer unit (transfer means) for transferring the toner image formed on the photosensitive drum 1102 serving as an image bearing member onto the sheet S.

A fixing unit 1118 serving as a fixing means is disposed above the secondary transfer portion in the casing 1101A. The fixing unit 1118 has a thermal fixing configuration for fixing a toner image by heating. The fixing unit 1118 includes a rotatable member pair (for example, a roller pair composed of a fixing roller and a pressure roller) that clamps and conveys a sheet S and a heat source (for example, a halogen lamp or an induction heating mechanism) that heats the toner image on the sheet S via the fixing roller.

Image Forming Operation

When the printer body 1101 executes an image forming operation, the sheets S are fed from the cassette 1113 at the bottom of the casing 1101A or the cassette 1113 in the sheet feeding unit 1130 by a feeding roller 1114 serving as a feeding means. A separation roller pair 1115 conveys the fed sheets S while separating them one by one. The sheet S is conveyed toward a registration roller pair 1117 by a drawing roller pair 1116 and abuts the nip portion of the stopped registration roller pair 1117 at a leading end, so that the skew of the sheet S is corrected. The registration roller pair 1117 feeds the sheet S into the secondary transfer portion at the timing synchronized with the progress of the toner image forming process performed by the image forming unit 1101B.

In the image forming unit 1101B, the photosensitive drum 1102 and the intermediate transfer belt 1108 rotate. The charging unit 1103 charges the surface of the photosensitive drum 1102 uniformly. The scanner unit 1104 applies laser light to the photosensitive drum 1102 based on image information representing the image to be printed on the sheet S to write an electrostatic latent image. This electrostatic latent image is developed (visualized) to a toner image with toner by the developing unit 1105.

For thermal press bonding (described below) using the sheet processing unit 1106, the scanner unit 1104 writes the electrostatic latent image by applying laser light to the photosensitive drum 1102 based on information representing the bonding position of the sheet S. The electrostatic latent image is developed by the developing unit 1105 with toner, so that a bonding toner image is formed in the area on the photosensitive drum 1102 corresponding to the bonding position on the sheet S.

The images formed on the photosensitive drums 1102 in the process cartridges 1195*y*, 1195*m*, 1195*c*, and 1195*k* are primarily transferred onto the intermediate transfer belt 1108 so as to overlap with one another and are then conveyed toward the secondary transfer portion by the rotation of the intermediate transfer belt 1108. In the secondary transfer portion, the toner image is transferred (secondarily transferred) to the sheet S fed from the registration roller pair 1117 by application of a voltage to the secondary transfer roller 1111. The sheet S that has passed through the secondary transfer portion is sent to the fixing unit 1118, where the toner is softened because the toner image is heated and pressed while the sheet S is passing through the nip portion between the fixing roller and the pressure roller and is thereafter firmly fixed, so that the image is fixed to the sheet S.

The sheet S that has passed through the fixing unit 1118 has its conveying path switched by a switching unit 1119. In the case of one-sided printing, the sheet S is guided to a discharge path 1190 by the switching unit 1119 and is discharged from the casing 1101A by a discharge roller pair 1191. In this embodiment, the printer body 1101 is joined to the sheet processing unit 1106 via an intermediate conveying unit 1192. The sheet S discharged from the discharge roller pair 1191 is transferred to the sheet processing unit 1106 via feed roller pairs 1193 and 1194 of the intermediate conveying unit 1192. If the intermediate conveying unit 1192 and the sheet processing unit 1106 are not joined together, the discharge roller pair 1191 discharges the sheet S, which is the result of printing, onto a loading tray 1135 at the top of the casing 1101A.

In the case of two-sided printing, the sheet S with images formed on a first surface is guided to a reversing roller pair r1 by the switching unit 1119. The sheet S is reversely conveyed (switched back) by the reversing roller pair r1 and is thereafter conveyed toward the registration roller pair 1117 via a two-sided conveying path r2. The sheet S passes through the secondary transfer portion and the fixing unit 1118, where images are formed on a second surface opposite to the first surface, and is discharged from the casing 1101A by the discharge roller pair 1191.

FIG. 6 is a diagram illustrating an example of the toner image formed on the sheet S. The illustrated sheet S has a toner image (also referred to as a print image or a printing toner image) 38 for recording text, figures, photos, or other images and a toner image (also referred to as a bonding image or a bonding toner image) 39 for bonding sheets S together.

The position, shape, width, length, and so on of the bonding toner image 39 can be changed within a range in which a thermal press-bonding unit 1167 (described below) is capable of thermal press bonding. The position, shape, width, length, and so on of the bonding toner image 39 can be set by the user operating an operating unit 205 of the image forming apparatus 1100, or alternatively, may be set by the user using the keyboard 26 or the mouse 27 of the PC 100 and by the image forming apparatus 1100 receiving the settings. The position, shape, width, length, and so on of the bonding toner image 39 may be set using the keyboard 26 or the mouse 27 of the PC 100 and by the image forming apparatus 1100 receiving the settings.

When the image forming apparatus 1100 produces a one-sided printed booklet, the bonding toner image 39 is formed only on one side of the sheet S (the same as the surface of the printing toner image). In the case of a two-sided printed booklet, the bonding toner image 39 may be formed only on one side of the sheet S or both sides of the sheet S.

Sheet Processing Unit

The sheet processing unit 1106 in FIG. 3B includes a buffer 1120 serving as a buffering means for placing multiple sheets S in layers, an alignment unit 1156 serving as an aligning means for aligning the multiple sheets S, and a thermal press-bonding unit 1167 for thermally bonding the sheets S together. The thermal press-bonding unit 1167 is an example of a sheet bonding unit (a bonding unit, a bonding means, a thermal-press-bonding unit, or a bonding processing unit) for bonding the sheets S together. The sheet processing unit 1106 further includes an upper output tray 1125 and a lower output tray 1137 capable of rising and falling as a destination to which the printing result of the image forming apparatus 1100.

The sheet processing unit 1106 receives multiple sheets S on which images are formed by the printer body 1101 one by one, bonding the sheets S (by thermal press bonding), and discharges the sheets S as a bundle of sheets (booklet). The buffer 1120, the alignment unit 1156, and the thermal press-bonding unit 1167 will be described below. The sheet processing unit 1106 can also discharge the sheets S on which images are formed by the printer body 1101 to the upper output tray 1125 or the lower output tray 1137 without processing the sheets S.

Buffer

Figure 4:
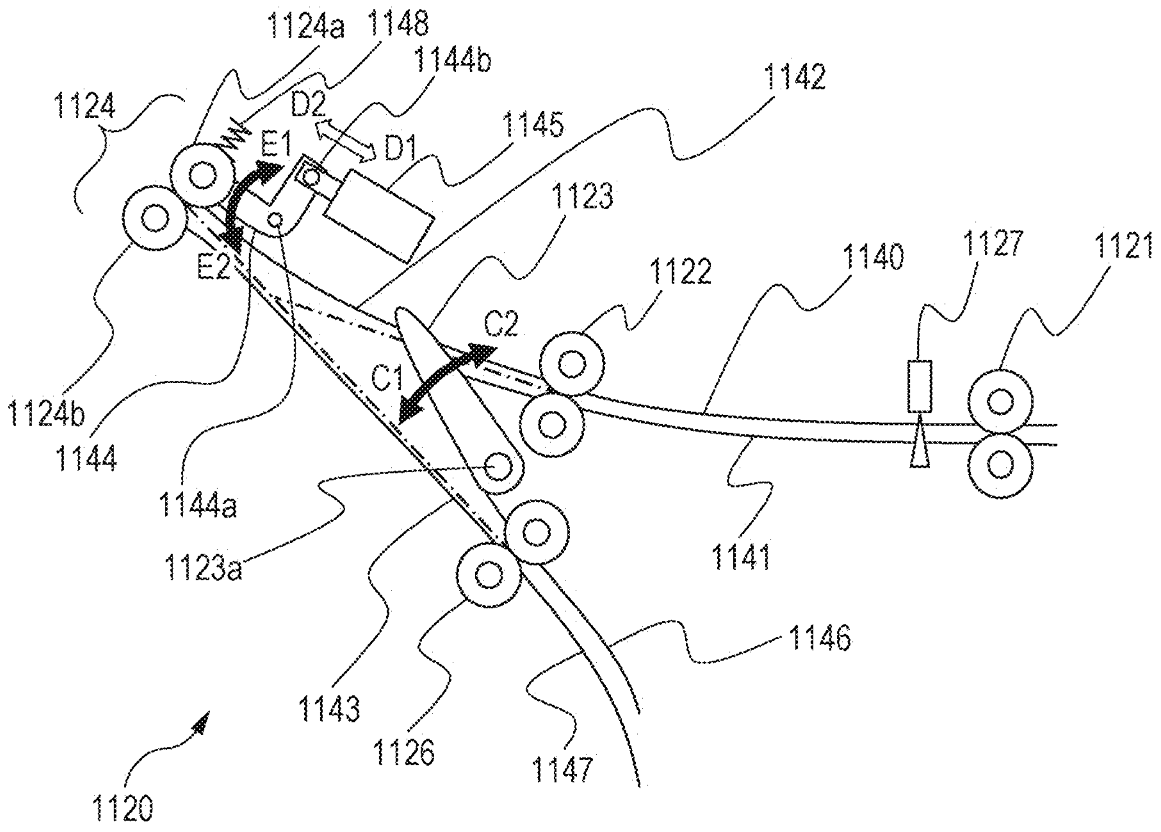
FIG. 4 is an enlarged sectional view of a buffer.

Next, the buffer 1120 will be described. FIG. 4 is an enlarged sectional view of the buffer 1120 in FIG. 3B. The buffer 1120 includes an inlet roller pair 1121, an in-front-of-buffer roller pair 1122, a check valve 1123, a reversing roller pair 1124*b*, and an inward discharge roller pair 1126. The buffer 1120 further includes an inlet sensor 1127 for detecting sheets S and a separation mechanism, such as a plunger solenoid 1145, for opening and closing (bringing into and out of contact with each other) the reversing roller pair 1124.

The inlet roller pair 1121, the in-front-of-buffer roller pair 1122, the reversing roller pair 1124, and the inward discharge roller pair 1126 are roller pairs for holding and conveying the sheets S. The inlet roller pair 1121 and the in-front-of-buffer roller pair 1122 are disposed in a conveying path (an inlet path) for the sheet processing unit 1106 to receive the sheets S. The reversing roller pair 1124 is disposed in a conveying path (a first discharge path, see FIG. 3B) communicating with the upper output tray 1125. The inward discharge roller pair 1126 is disposed in a conveying path (an inward discharge path, see FIG. 3B) extending from the reversing roller pair 1124 toward the thermal press-bonding unit 1167. The sheet processing unit 1106 includes a conveying path (a second discharge path, see FIG. 3B) extending from the thermal press-bonding unit 1167 toward the lower output tray 1137.

The inlet path is formed of an inlet upper guide 1140 and an inlet lower guide 1141. The first discharge path is formed of a reversing upper guide 1142 and a reversing lower guide 1143. The inward discharge path is formed of an inward-discharge upper guide 1146 and an inward-discharge lower guide 1147.

The inlet sensor 1127 is disposed so as to detect the sheet S received by the inlet roller pair 1121. One example of the inlet sensor 1127 is a reflection photosensor that determines whether a sheet S is present by applying infrared light to the inlet path through an opening provided at the inlet upper guide 1140 and detecting reflected light from the sheet S. The inlet lower guide 1141 may have a hole with a diameter larger than or equal to the spot diameter of infrared light emitted from the inlet sensor 1127 so as not to reflect the infrared light while no sheet is passing through the inlet path.

The check valve 1123 is disposed downstream from the in-front-of-buffer roller pair 1122 in the sheet conveying direction in the inlet path. The check valve 1123 is disposed so as to be rotatable about a rotation shaft 1123*a* with respect to the inward-discharge upper guide 1146. The check valve 1123 is movable between a first position where the movement (back-flow) of the sheet S from the first discharge path to the inlet path is prevented and a second position where the movement of the sheet S from the inlet path to the first discharge path is allowed. The check valve 1123 is urged by a spring (not shown) in a direction C2 from the second position to the first position. The check valve 1123 is configured to move in a direction C1 from the first position to the second position when pressed by the sheet S, and after the sheet S has passed, to return to the first position.

The distal end of the check valve 1123 at the first position overlaps with the reversing upper guide 1142 seen in the direction of the rotation axis of the check valve 1123. The distal end of the check valve 1123 is formed like a comb so as to allow for overlapping with the reversing upper guide 1142. The check valve 1123 at the second position and the reversing upper guide 1142 form a space through which the sheet S can pass as seen in the direction of the rotation axis of the check valve 1123.

The reversing roller pair 1124 is formed of a reversing upper roller 1124*a* and a reversing lower roller 1124*b*, both of which are supplied with a driving force. The rotation of the reversing upper roller 1124*a* and the reversing lower roller 1124*b* are configured to be synchronized at all times. The reversing upper roller 1124*a* connects to a separating lever 1144. The separating lever 1144 is supported so as to be rotatable about a lever fulcrum shaft 1144*a* with respect to the reversing upper guide 1142. The separating lever 1144 is rotatably connected to the plunger solenoid 1145 with a solenoid joint shaft 1144*b*.

Feeding a current through the plunger solenoid 1145 moves the core in a direction D1 in the drawing, which causes the separating lever 1144 to rotate in a direction E1 in the drawing. This causes the reversing roller pair 1124 to enter a separation state in which the reversing upper roller 1124*a* and the reversing lower roller 1124*b* are spaced apart (the nip portion is opened). When the current flowing through the plunger solenoid 1145 stops, the reversing upper roller 1124*a* moves in a direction E2 due to the urging force of a pressure spring 1148, and the core of the plunger solenoid 1145 moves in a direction D2. This causes the reversing roller pair 1124 to enter a contact state in which the reversing upper roller 1124*a* and the reversing lower roller 1124*b* are in contact with each other (a nip portion is formed).

The buffer 1120 performs the operation of stacking newly conveyed sheets S on top of sheets S (bundle) while moving the sheets S (bundle) back and forth between the reversing roller pair 1124 and the inward discharge roller pair 1126, as will be described below. This operation allows the buffer 1120 to send the sheets S to the alignment unit 1156 in stacks of a predetermined number (for example, five sheets) each.

The bundle of sheets S stacked by the buffer 1120 is conveyed from the inward discharge roller pair 1126 to a kick-out roller pair 1129 via an intermediate feed roller pair 1128, as illustrated in FIG. 3B. The sheet bundle is conveyed to the alignment unit 1156 (an intermediate stacking unit or a processing stage) including an intermediate upper guide 1151 and an intermediate lower guide 1152 by the kick-out roller pair 1129. A bundle hold flag 1150 for preventing the trailing ends of the stacked sheets S from rising is disposed downstream from the kick-out roller pair 1129 so that the trailing ends of the stacked sheets S and the leading end of the subsequent sheet S conveyed to the alignment unit 1156 do not interfere with each other.

Operation of Thermal-Press Bonding Unit

The thermal press-bonding operation of the thermal press-bonding unit 1167 will be described with reference to FIGS. 5A to 5F. FIGS. 5A to 5F are diagrams of the thermal press-bonding unit 1167 seen in the sheet conveying direction (Y-direction).

Figures 5A, 5B, 5C, 5D, 5E, 5F:
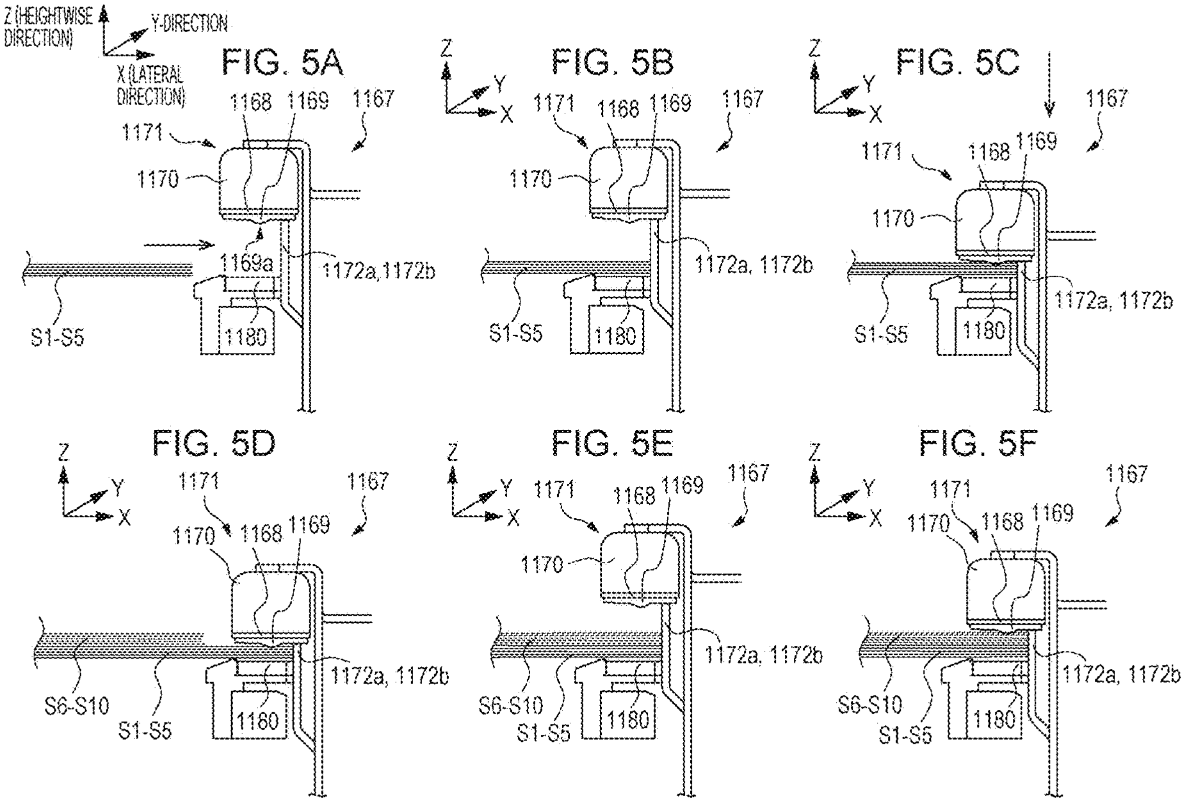
FIGS. 5A to 5F are diagrams illustrating the operation of a thermal press-bonding unit.

FIG. 5A illustrates a state in which alignment of sheets S1 to S5 in the sheet conveying direction (Y-direction) is completed. In this state, a heater 1171 is at a position spaced apart from the sheet bundle in the Z-direction.

FIG. 5B illustrates a state in which alignment of the sheets S1 to S5 in the width direction is completed. The sheets S1 to S5 are aligned in the sheet width direction (X-direction) by butting widthwise-alignment reference plates 1172*a* and 1172*b*.

FIG. 5C illustrates a state in which the heater 1171 moves in the pressing direction (to the −Z side) by the positive rotation of a motor 1170, so that a contact surface 1169*a* of a pressing plate 1169 comes into contact with the uppermost sheet S5.

FIG. 5D illustrates a state in which the sheets S1 to S5 are held between the pressing plate 1169 and a backing plate 1180 by the continuous driving of the motor 1170, and the thermal press bonding of the sheets S1 to S5 is being performed. FIG. 5D also illustrates a state in which the next sheets S6 to S10 are conveyed to the alignment unit 1156 in parallel with the thermal press-boding of the sheets S1 to S5.

FIG. 5E illustrates a state in which, after completion of the thermal press bonding of the sheets S1 to S5, the heater 1171 moves (retracts) to the opposite side (+Z side) of the pressing direction by the reverse rotation of the motor 1170 to separate the pressing plate 1169 from the sheet S5. FIG. 5E also illustrates a state in which the next sheets S6 to S10 are aligned, and after the heater 1171 retracts, the sheets S1 to S5 are butted against the widthwise-alignment reference plates 1172*a* and 1172*b*.

FIG. 5F illustrates a state in which the heater 1171 is moved again in the pressing direction (−Z side) by the positive rotation of the motor 1170, so that the sheets S1 to S10 are held between the pressing plate 1169 and the backing plate 1180, and the sheets S6 to S10 are being thermally press-bonded. Here, since the bonding toner image is formed on the upper surface of the sheet S5 and/or the lower surface of the sheet S6, the bundle of sheets S1 to S5 and the bundle of sheets S6 to S10 are thermally press-bonded.

Thus, the thermal press-bonding unit 1167 can produce a booklet formed of a number of sheets larger than a predetermined number by performing a thermal press-bonding operation each time a bundle of a predetermined number of sheets is aligned by the alignment unit 1156. Although this is an example in which a booklet formed of ten sheets S1 to S10 is produced, a booklet formed of several tens of sheets may be produced.

Upon completion of thermal press bonding of all the sheets S constituting one booklet, the booklet formed of the sheets S1 to S10 is pushed out by a vertical-alignment reference plate 1168 and is conveyed in the direction toward a bundle-discharge roller pair 1136 (−Y side) (see FIG. 3B) in the sheet conveying direction. In other words, the vertical-alignment reference plate 1168 is an example of a push-out member for pushing the sheet bundle out of the alignment unit 1156 and the thermal press-bonding unit 1167. In addition to the vertical-alignment reference plate 1168 serving as the reference for aligning the sheet bundle, a push-out member for pushing out processed sheet bundles may be provided.

The bundle-discharge roller pair 1136 is an openable and closable (contact and separatable) roller pair and accepts the booklet in a separate state. After the distal end of the booklet in the booklet push-out direction of the vertical-alignment reference plate 1168 passes beyond the position of the bundle-discharge roller pair 1136, the movement of the vertical-alignment reference plate 1168 is stopped, and the bundle-discharge roller pair 1136 switches to the contact state. This allows the bundle-discharge roller pair 1136 to convey the booklet by gripping the booklet and discharge the booklet to the lower output tray 1137. After passing the booklet to the bundle-discharge roller pair 1136, the vertical-alignment reference plate 1168 returns to the standby position.

Thus, also the configuration of this embodiment allows for providing a sheet bonding unit capable of bonding sheets with more stability, a sheet processing unit, and an image forming apparatus.

Next, the printer driver will be described with reference to FIGS. 7A and 7B.

The printer driver is a printing control program installed in the PC 100 and is executed by the CPU 21. The printer driver is called from a document program installed in the PC 100 and generates print information containing a print setting command for printing and a command for drawing data to be printed. The print information that the CPU 21 generates using the printer driver is transmitted to the image forming apparatus 1100, connected via the communication line 150 using an operating system (OS), where printing processing and sheet processing are performed.

Figure 7A:
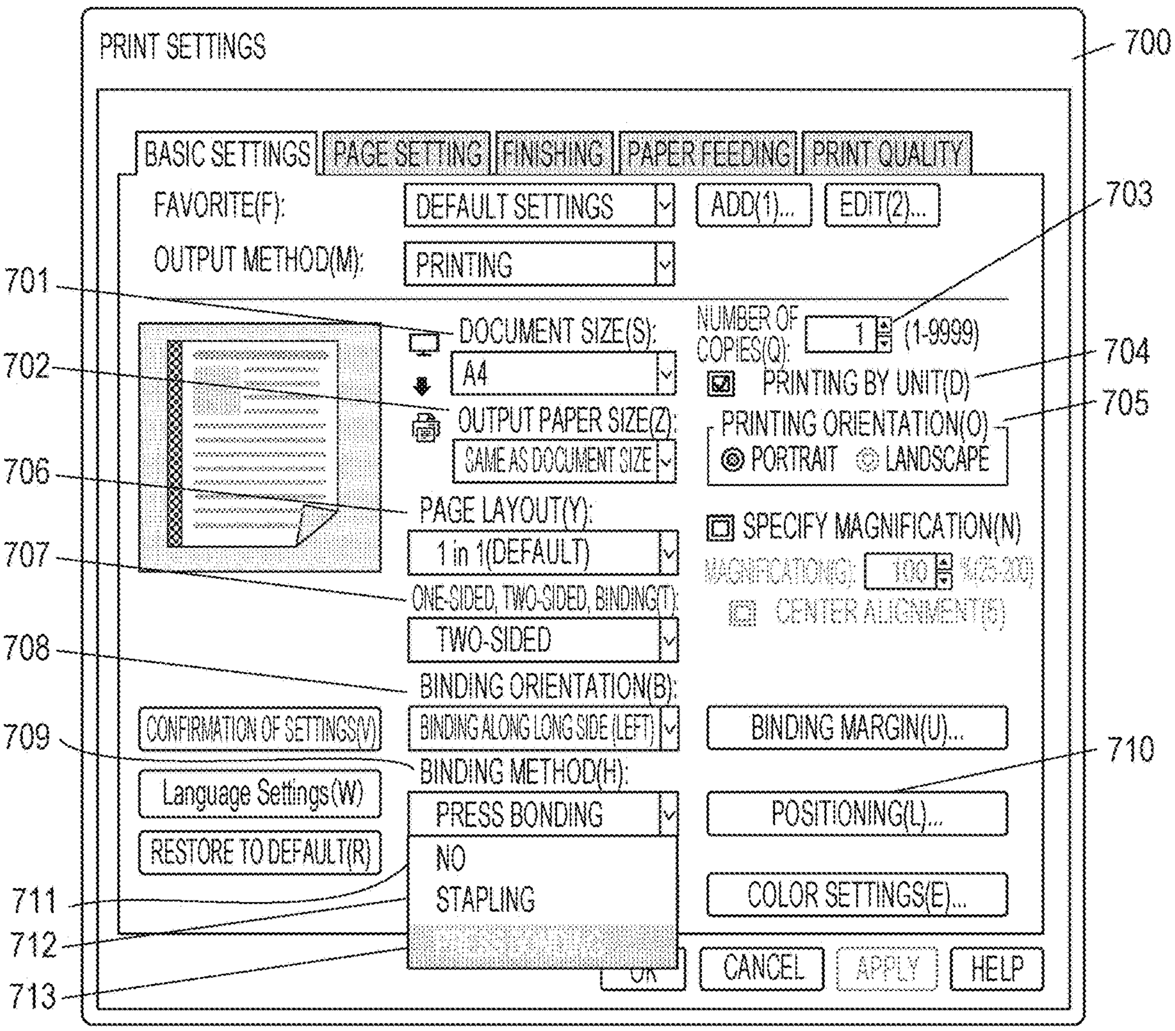
FIGS. 7A to 7B are diagrams illustrating examples of the print setting screen of the printer driver.

FIG. 7A illustrates an example of the print setting screen of the printer driver installed in the PC 100. The print setting screen 700 is displayed on a display or another display device based on an instruction from the CPU 21, and the user performs print settings using an input device, such as a mouse or a keyboard, via the screen.

The print setting screen 700 provides basic print settings, such as Document size 701, Paper size 702, Number of copies 703, Printing by unit 704, and Printing orientation 705. Available advanced printing functions include Page layout 706 for setting layout printing or the like, One-sided/two-sided/bookbinding 707 for setting one-sided, two-sided, and bookbinding printing, and Binding orientation 708 for setting the binding orientation of printed materials. The print setting screen 700 of an embodiment of the present disclosure further provides control of Binding method 709 for setting a binding method for printed materials. The print setting screen 700 in FIG. 7A is a screen for setting Binding method 709, which allows setting "No" 711 not to perform binding, "Stapling" 712 for stapling, and "Press-bonding" 713 for thermal press bonding according to an embodiment of the present disclosure.

Figure 7B:
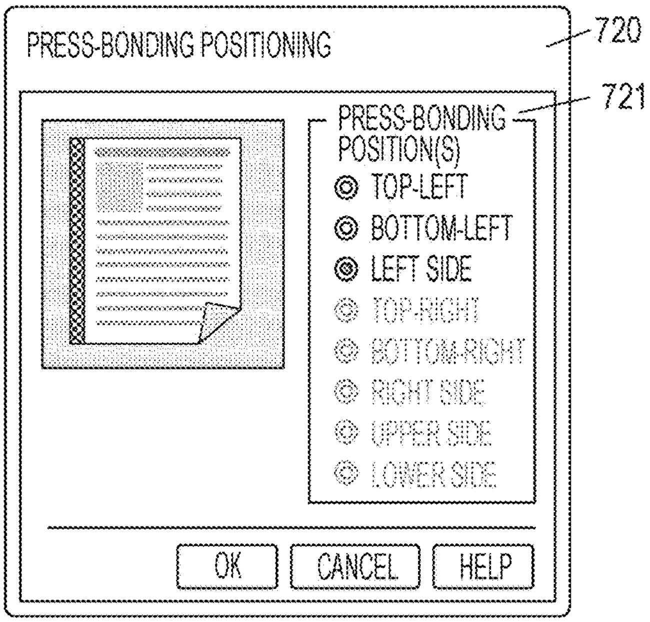

FIG. 7B illustrates a setting screen for specifying the position to which the binding method set with Binding method 709 is applied. The setting screen is displayed on a display device, such as a display, based on an instruction from the CPU 21 when Positioning button 710 in FIG. 7A is pressed. If Press bonding 713 is set in Binding method 709, a press-bonding positioning screen 720 as illustrated in FIG. 7B is displayed. The user sets Press-bonding position 721 on the press-bonding positioning screen 720. The radio buttons for settable press-bonding positions are displayed in an enabled state, while the radio buttons for setting disable press-bonding positions are displayed in a disabled state. The user specifies a desired press-bonding position from the radio buttons for the press-bonding positions in the enabled state. In the example in FIG. 7B, Top-left, Bottom-left, and Left side are settable and enabled, and Left side is selected. In addition to Top-left, Bottom-left, and Left side, Top-right, Bottom-right, Right side, Upper side, and Lower side may be settable. The set press-bonding position can be achieved by rotating the image to correct its orientation or conveying the sheet S on the conveying path.

When Press-bonding 713 is set for Binding method 709, the CPU 21 adds a command to execute thermal press bonding to the position set at Press-bonding position 721 to print data using the printer driver, and the PC 100 transmits the print data to the image forming apparatus 1100. On reception of the print data, the CPU 21 of the image forming apparatus 1100 prints a print image and a bonding image on a sheet based on the print data, the press-bonding unit 207 of the image forming apparatus 1100 executes heating and pressing processes on the position of the bonding image for thermal press bonding.

Figure 8A:
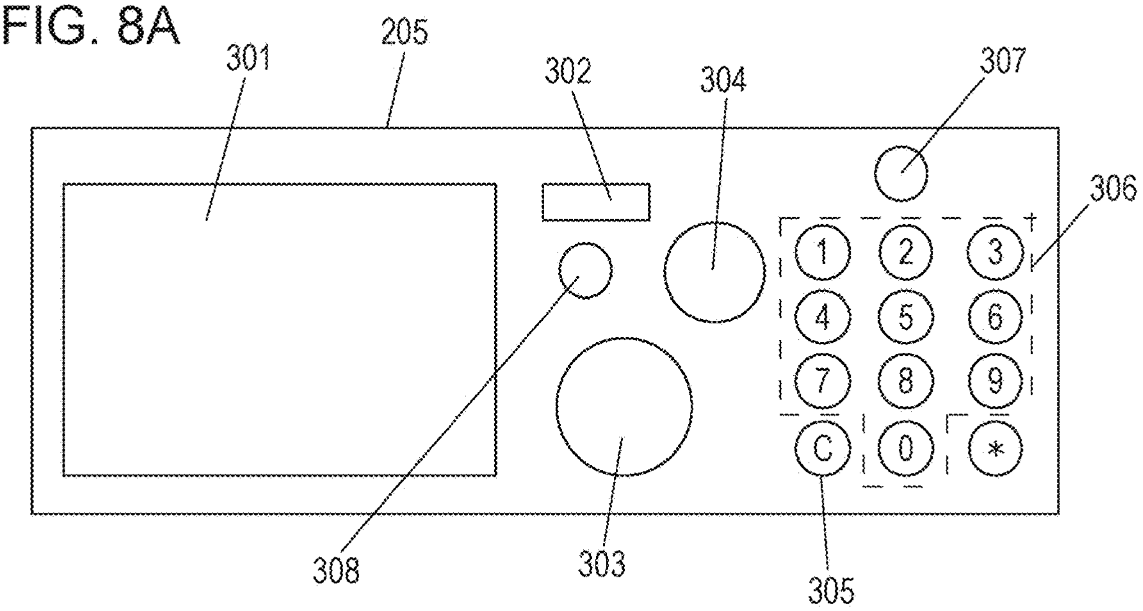
FIG. 8A is a plan view of the operating unit.

In FIG. 8A, the operating unit 205 is an operating unit for the image forming apparatus 1100. The user inputs and sets a variety of conditions and information items to the image forming apparatus 1100 with the operating unit 205.

Figure 8B:
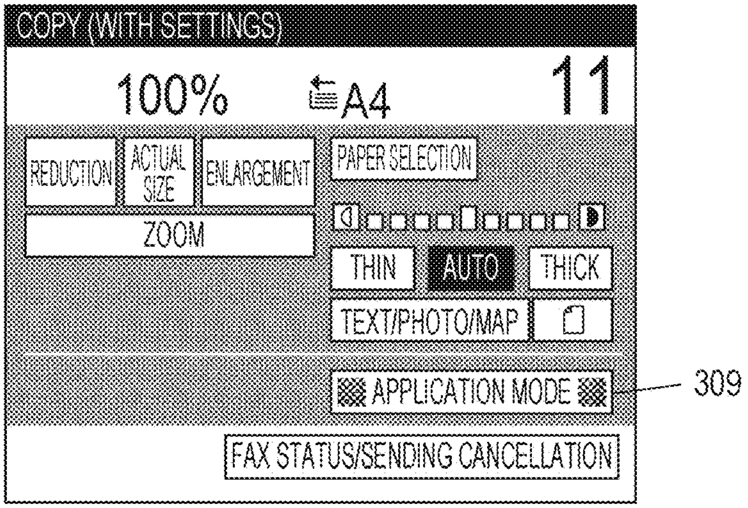
FIGS. 8B and 8C are diagrams illustrating examples of the screen displayed on a touch panel.

FIG. 8A is a plan view of the operating unit 205 of this embodiment. A touch panel display 301 typically displays Number of copies, Selected paper size, Magnification, and Copy density, as illustrated in FIG. 8B. When Application mode 309 on this screen is pressed, the screen transitions to a screen where various settings for the copy job are available.

A reset key 302 is a key for returning a copy mode to a normal mode.

A start key 303 is a key for starting a copying operation.

A stop key 304 is a key for interrupting the copying operation.

A clear key 305 is a key for returning the copy mode to a normal mode.

A numeric keypad 306 is a keypad for setting the number of copies.

A user mode key 307 is a key for menu selection, with which the user can register various settings for the image forming apparatus 1100.

Figure 8C:
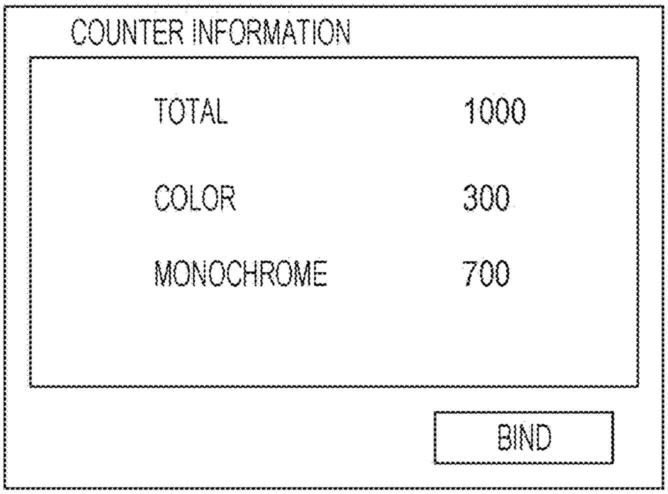

A counter key 308 is a key for displaying counter information as the history. When the counter key 308 is pressed, the CPU 200 displays a screen as in FIG. 8C on the touch panel display 301. The user recognizes various items of counter information with such a screen. In the example in FIG. 8C, the user can recognize that the number of color printed copies is 300, the number of monochrome printed copies is 700, and the total number of color printed copies and monochrome printed copies is 1,000.

The touch panel display 301 is also used to notify the user of sheet jam information, toner information, etc.

Next, the printing process and the counter increment process of the image forming apparatus 1100 of this embodiment will be described with reference to the flowchart in FIG. 9.

Figure 9:
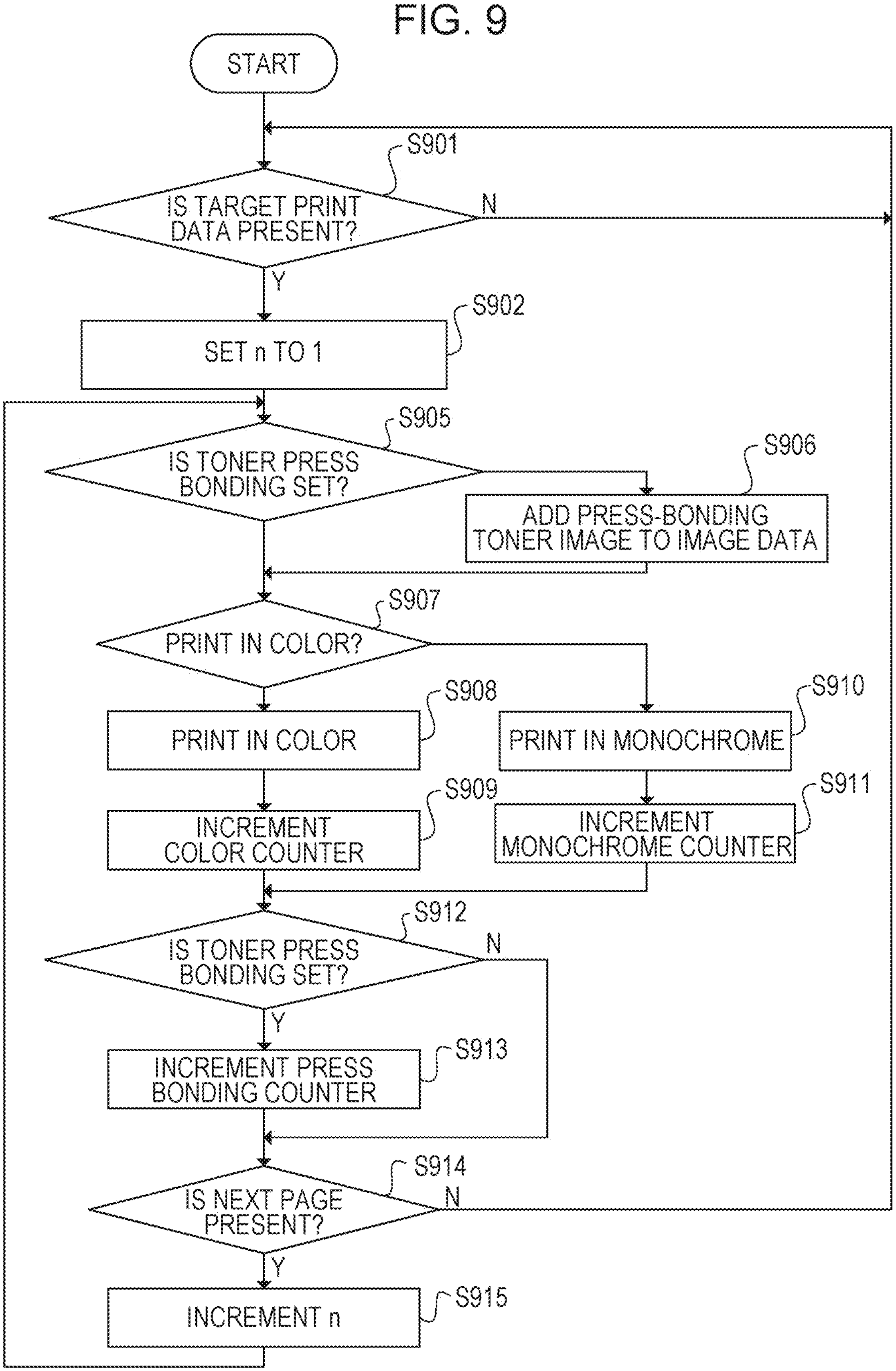
FIG. 9 is a flowchart for the processing of the image forming apparatus according to the first embodiment.

The flowchart in FIG. 9 is started when the image forming apparatus 1100 is powered on.

The processing of the flowchart in FIG. 9 is performed by the CPU 200 reading a program stored in the ROM 201 or the HDD 203 into the RAM 202 and executing the program.

In this embodiment, the bonding toner image 39 is formed with a black toner Tk.

In S901, the CPU 200 determines whether print data to be printed is stored in the RAM 202. This print data is received from the external PC 100 via the network IF 208. The print data contains image data and print settings set on the screens of the printer driver of the PC 100 in FIGS. 7A and 7B. The print data may be for a copy job responsive to copy instructions received via the operating unit 205. In this case, the print data contains print settings received on the copy screen in FIG. 8B and image data generated by scanning a document with the scanner 209.

If it is determined that no print data is stored in the RAM 202, the CPU 200 repeats the process of S901.

If it is determined that print data is stored in the RAM 202, the CPU 200 proceeds with the processing to S902.

In S902, the CPU 200 prepares a variable n for the RAM 202 and initializes the value n to 1.

In S905, the CPU 200 determines whether toner press bonding for bonding sheets with a press-bonding toner has been set. If it is determined that toner press bonding has been set, the CPU 200 proceeds with the processing to S906.

In S906, the CPU 200 adds a press-bonding toner image 39 to the image data stored in the RAM 202.

If it is determined that toner press bonding is not set, the CPU 200 proceeds with the processing to S907.

In S907, the CPU 200 determines whether to print image data of the nth page in color or in monochrome based on the print settings contained in the print data and the image data. For example, if color printing is set in the printer driver, the CPU 200 determines to perform color printing based on the print settings contained in the print data. If color printing is set in the printer driver, but there is no color data in the image data contained in the print data, the CPU 200 may determine to perform monochrome printing. In contrast, if monochrome printing is set in the printer driver, the CPU 200 determines to perform monochrome printing based on the print settings contained in the print data. For a copy job, the CPU 200 makes a similar determination based on the scanning settings set via the operating unit 205 and image data generated by scanning a document with the scanner 209. If the CPU 200 determines to perform color printing, the CPU 200 proceeds with the processing to S908, and if the CPU 200 determines to perform monochrome printing, the CPU 200 proceeds with the processing to S910.

In S908, the CPU 200 causes the printer 204 to print the image data of the nth page contained in the print data in color with a yellow toner Ty, a magenta toner Tm, a cyan toner Tc, and a black toner Tk based on the print settings contained in the print data. If toner press bonding is set, the CPU 200 causes the printer 204 to print images based on the image data that contains the press-bonding toner image 39 added in S906.

In S909, the CPU 200 increments a color counter for color printing by 1. This color counter is stored in the HDD 203 as the history of color printing. In the color printing, the number of printed sheets is stored as the history in the HDD 203. This example is illustrative only, and another example will be described below.

In S910, the CPU 200 causes the printer 204 to print the image data of the nth page contained in the print data in monochrome with the black toner Tk based on the print settings contained in the print data. If toner press bonding is set, the CPU 200 causes the printer 204 to print images based on the image data containing the press-bonding toner image added in S906.

In S911, the CPU 200 increments a monochrome counter for black by 1. This monochrome counter is stored in the HDD 203 as the history of monochrome printing. In the monochrome printing, the number of printed sheets is stored as the history in the HDD 203. This example is illustrative only, and another example will be described below.

In S912, the CPU 200 determines whether toner press bonding for bonding sheets together with the press-bonding toner has been set. If the CPU 200 determines that toner press bonding has been set, the CPU 200 proceeds with the processing to S913.

In S913, the CPU 200 increments the press-bonding counter for the press-bonding toner by 1. This press-bonding counter is stored in the HDD 203 as the history of sheet processing for bonding multiple sheets with a toner. Here, the history stored in the HDD 203 is the number of sheets to which toner for use in sheet processing for bonding multiple sheets is applied. The example of the history is illustrative only, and another example will be described below.

In contrast, if in S912 the CPU 200 determines that toner press bonding for bonding sheets with a press-bonding toner is not set, the CPU 200 proceeds with the processing to S914 without incrementing the value of the press-bonding counter for the press-bonding toner.

In S914, the CPU 200 determines whether the next page is present, and if there is no next page, the CPU 200 proceeds with the processing to S901. If it is determined that the next page is present, the CPU 200 proceeds with the processing to S915.

In S915, the CPU 200 increments the value of n and proceeds with the processing to S905.

Thus, the value of the color counter, the value of the monochrome counter, and the value of the press-bonding counter stored in the HDD 203 are accessible by the user later on. Specifically, the user presses the counter key 308 of the operating unit 205. When the counter key 308 is pressed, the CPU 200 displays the screen illustrated in FIG. 10 on the operating unit 205. The screen illustrated in FIG. 10 displays the value of the color counter, the value of the monochrome counter, and the value of the press-bonding counter, as well as the value of a total counter that is the sum of the value of the color counter and the value of the monochrome counter.

Thus, the monochrome counter and the press-bonding counter are separately managed and can be accessed later on, which allows the user to easily determine whether a black toner is consumed for forming image data in the print data or for press-bonding.

In this embodiment, detection of the target print data is performed in S901, and initialization of the counters in the HDD 203 is performed in S902. However, this is illustrative only. The value of the monochrome counter and the value of the press-bonding counter may be stored in a memory attached to the black toner cartridge 1195*k*. The allows S901 and S902 to be eliminated.

Figure 10:
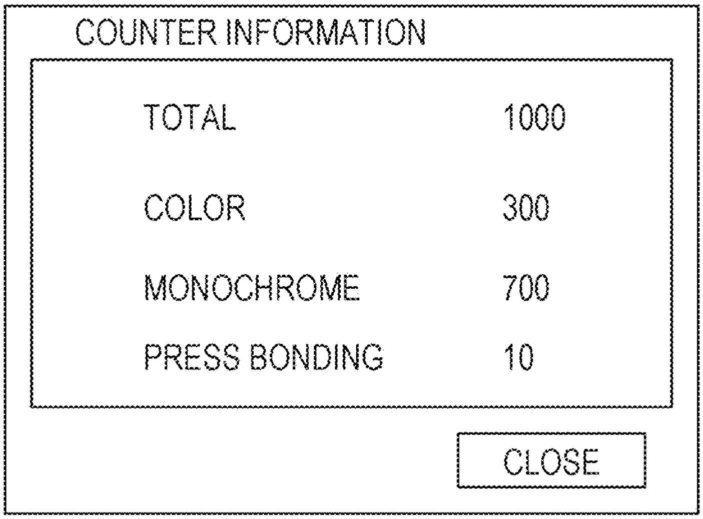
FIG. 10 is a diagram illustrating an example of a display of counter information.

In this case, when the counter key 308 is pressed, the CPU 200 displays the screen illustrated in FIG. 10 on the operating unit 205 based on the value of the monochrome counter and the value of the press-bonding counter read from the memory attached to the black toner cartridge 1195*k*.

In the above embodiment, the value of the color counter and the value of the monochrome counter are incremented by one. Alternatively, the values to be added may be changed depending on the paper size set in print settings. For example, if the paper size is A4-size or less, the values may be added by 1, and if the paper size exceeds A4-size, the values may be added by 2.

Although the value of the press-bonding counter is added by 1, the value to be added may be changed depending on the paper size set in the print settings. For example, if the paper size is A4-size or less, the CPU 200 applies the press-bonding toner image 39 with a width w in S906, and increments the press-bonding counter by 1 in S913. In contrast, if the paper size exceeds A4-size, the CPU 200 applies a press-bonding toner twice the width w in S906 and increments the press-bonding counter by 2 in S913 to increase the bonding force.

Alternatively, the user may be allowed to set the value of the width w via the operating unit 205 regardless of the paper size, and the increment value of the press-bonding counter in S913 may be changed depending on the set width. For example, if the width w set by the user is a predetermined value or less, the CPU 200 may increment the press-bonding counter by 1 in S913, and if the width w set by the user is greater than the predetermined value, the CPU 200 may increment the press-bonding counter by 2 in S913.

The CPU 200 may count up the press-bonding counter in S913 by a value based on, not the width w, the toner consumed for the bonding toner image 39. The amount of toner consumed may be obtained with a video counter or a sensor provided at the toner cartridge. This makes it easy for the user to properly ascertain the cause of the toner consumption even if the width and density of the bonding toner image 39 change.

Figure 13A:
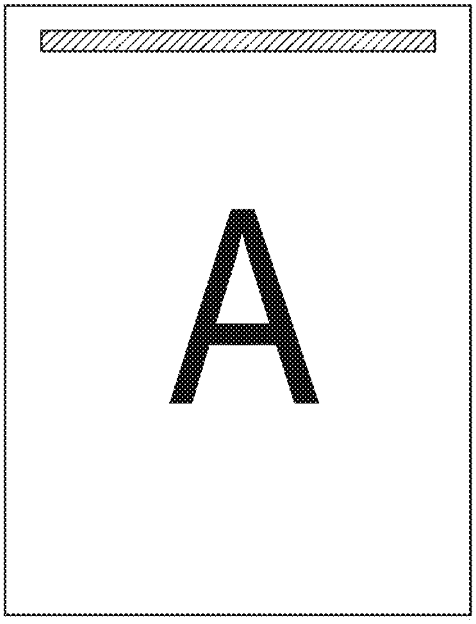
FIGS. 13A and 13B are diagrams illustrating examples of the toner images formed on a sheet by the image forming apparatus.
Figure 13B:
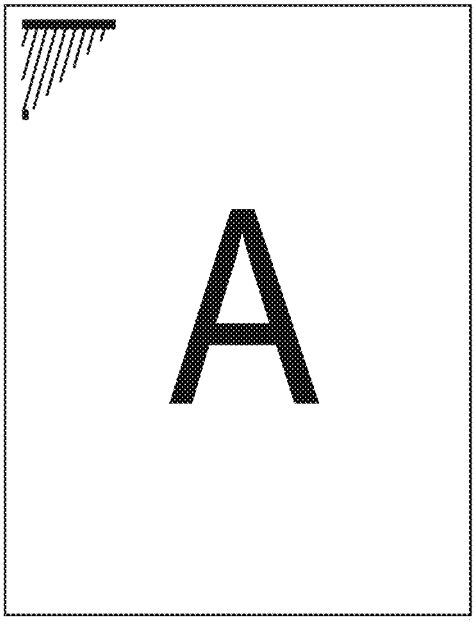

The press-bonding counter may be provided at each press-bonding position set on the screen in FIG. 7B or the screen of the operating unit 205 for a copy job corresponding to this screen. Specifically, if the press-bonding position is the left side or the right side, the CPU 200 increments the press-bonding counter by 1 in S913. If the press-bonding position is top-left, bottom-left, top-right, or bottom-right, the CPU 200 increments the press-bonding counter by 0.5 in S913. If the press-bonding position is the upper side or lower side, the CPU 200 increments the press-bonding counter by 0.7 in S913. This is because more toner is consumed when the press-bonding position is the left side or right side than when the press-bonding position is top-left, bottom-left, top-right, bottom-right, upper side or lower side. For example, when the press-bonding position is set at the upper side, the bonding toner image is formed at the position as illustrated in FIG. 13A, where the area of the bonding toner is smaller than the area of the bonding toner image 39 in FIG. 6, resulting in lower toner consumption. When the press-bonding position is set at top-left, the bonding toner image is formed at the position as illustrated in FIG. 13B, where the area of the bonding toner is smaller than the area of the bonding toner image 39 in FIG. 6, resulting in lower toner consumption. This is the reason for changing the increment of the press-bonding counter depending on the press-bonding position. Increment and press-bonding setting may be performed for each press-bonding position, and the number of press-bonding processes may be displayed.

The CPU 200 may reset the press-bonding counter to 0 in response to detecting replacement of the black toner cartridge 1195*k*.

At that time, the CPU 200 resets the value of the monochrome counter to 0.

In the above embodiment, the values of the press-bonding counter and the monochrome counter are used as the history to be referred to. Alternatively, the remaining toner amount may be calculated based on both of the press-bonding counter and the monochrome counter and may be displayed on the operating unit 205 according to an instruction from the user.

In this embodiment, the bonding toner image 39 is formed at an end of a sheet with the black toner Tk. This is illustrative only. A transparent toner cartridge may be additionally mounted, and a transparent toner may be used as a press-bonding toner. Forming the transparent toner at an end of a sheet allows for binding the end of the sheet, and applying a transparent toner to the entire surface of a sheet allows for press-bonding the entire sheet. In the case where application on the entire surface of a sheet is set by the printer driver or the operating unit 205, more toner is consumed than for end press-bonding, an end press-bonding counter and an entire-surface press-bonding counter may be separately prepared and may be individually incremented according to the process.

In the case of a configuration in which a toner consumption based on the printable number or days before toner runs out is predicted with a counter, prediction using the press-bonding counters allows for predicting more accurate toner consumption.

Second Embodiment

In the first embodiment, the press-bonding counter is managed and can be referred to later on.

In this embodiment, the upper limit is set on the number of times the press-bonding setting is used, and when the press-bonding counter reaches the upper limit, the use of the press-bonding setting is restricted.

In this embodiment, for example, a restrictive mode in which a predetermined number of press-bonding jobs can be performed and a nonrestrictive mode in which there is no restriction on the number of press-bonding jobs performed, and the restrictive mode is set from the operating unit 205 or the PC 100 in a default setting.

In this embodiment, the case where press-bonding jobs can be performed for up to 500 pages with a toner cartridge capable of printing 1,000 pages will be described with reference to FIG. 11.

Figure 11:
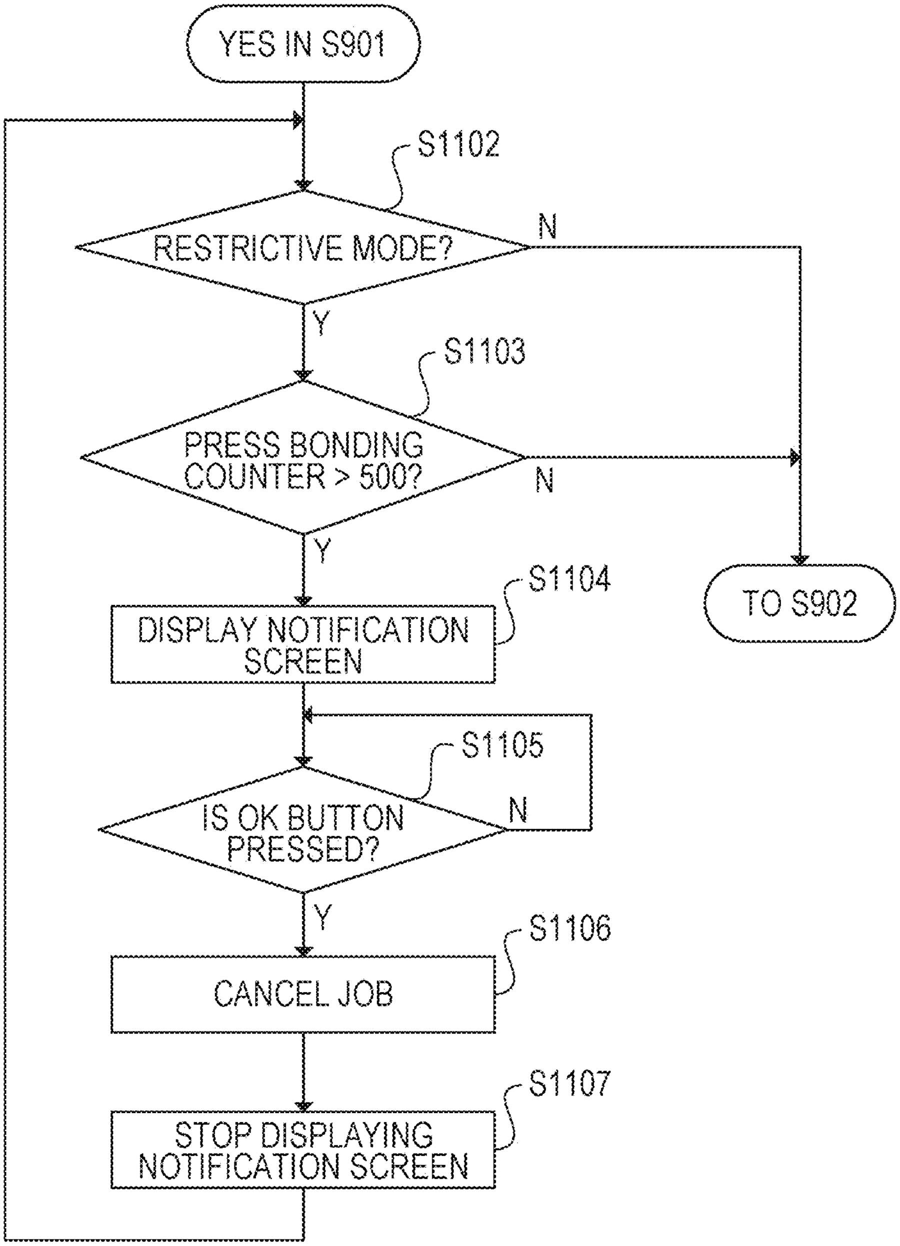
FIG. 11 is a flowchart for the processing of the image forming apparatus according to a second embodiment.

The processing illustrated in the flowchart of FIG. 11 is performed by the CPU 200 reading a program stored in the ROM 201 or the HDD 203 into the RAM 202 and executing the program.

In this embodiment, the bonding toner image 39 is formed with the black toner Tk.

If in S901 of FIG. 9 it is determined that print data to be printed is stored in the RAM 202, the CPU 200 executes the process of S1102.

In S1102, the CPU 200 determines whether the image forming apparatus 1101 is set in the restrictive mode. If it is determined that the restrictive mode is set, the CPU 200 proceeds with the processing to S1103. In contrast, if it is determined that the restrictive mode is not set, the CPU 200 proceeds with the processing to S902 in FIG. 9.

In S1103, the CPU 200 determines whether the press-bonding counter exceeds 500. If it is determined that the press-bonding counter does not exceed 500, the CPU 200 proceeds with the processing to S902 in FIG. 9. In contrast, if it is determined that the press-bonding counter exceeds 500, the CPU 200 proceeds with the processing to S1104.

Figure 12:
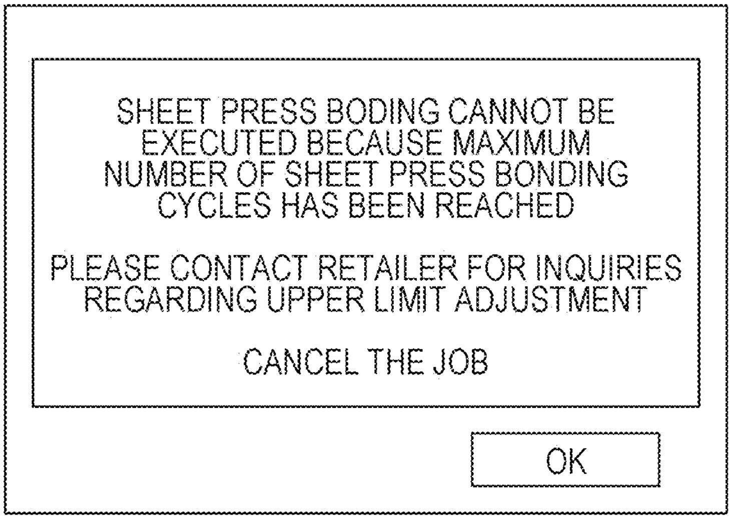
FIG. 12 is a diagram illustrating a notification screen according to the second embodiment.

In S1104, the CPU 200 displays the notification screen illustrated in FIG. 12 on the operating unit 205.

The screen illustrated in FIG. 12 displays messages that press-bonding of sheets cannot be executed and that contact to the retailer is required to execute press-bonding of sheets. The screen illustrated in FIG. 12 also displays a message to cancel the current job and an OK button.

In S1105, the CPU 200 determines whether the OK button in FIG. 12 has been pressed.

If it is determined that the OK button has not been pressed, the CPU 200 repeats the determination in S1105.

If the OK button has been pressed, the CPU 200 proceeds with the processing to S1106.

In S1106, the CPU 200 cancels the print job to print the print data specified as the print target in S901 and proceeds with the processing to S1107.

In S1107, the CPU 200 stops displaying the notification screen displayed in S1104 and proceeds with the processing to S1102.

The restrictive mode can be changed not only by the user but also by the person in charge of the retailer using an information processing apparatus (not shown). If the information forming apparatus 1101 is set to the nonrestrictive mode, the determination step in S1102 goes to No, where press-bonding setting becomes available.

Thus, restricting the number of times the press-bonding setting is used allows restricting the usage of the bonding toner image 39.

Although, in S1104, the CPU 200 displays the notification screen illustrated in FIG. 12 on the operating unit 205, the present disclosure is not limited to this example. For example, in S1104, the CPU 200 may notify the PC 100 that the press-bonding counter has reached the upper limit, so that the CPU 21 of the PC 100 cannot perform the press-bonding setting with the printer driver.

Other Embodiments

Although the above embodiments illustrate a tandem color printer configuration including four process cartridges, the color printer may have five or more types of toner or three or less types of toner. For example, if the image forming apparatus 1100 is a monochrome machine, the image forming apparatus 1100 includes only the black toner black 1195*k* and manages only the monochrome counter and the press-bonding counter as counter information, which can be displayed later on.

Alternatively, in place of the method of using any of the cyan, magenta, yellow, or black toners as a press-bonding toner, a toner only for press-bonding may be used. In this case, the toner only for press-bonding is used not only to form the print image 38 but only to form the bonding toner image 39.

In the above embodiments, the value of the press-bonding counter is used for the user to check the history of toner press bonding or to put restriction. The value of the press-bonding counter may also be used to calculate the amount of money for billing.

In the above embodiments, the history of image formation and the history of sheet processing are separately stored. Alternatively, both of image formation using a recording material and sheet processing for binding multiple sheets using the recording material may be managed with one counter. In this case, for example, when only image formation using a recording material is performed on one sheet, the counter is incremented by 1, and when only application of toner for sheet processing of binding multiple sheets using a recording material is performed on one sheet, the counter is incremented by 0.5. When image formation using a recording material and application of toner for sheet processing for binding multiple sheets using a recording material are performed on the same sheet, the counter is incremented by 1.5.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-091295, filed Jun. 2, 2023, which is hereby incorporated by reference herein in its entirety.

What is claimed is:

1. An image forming system comprising:

an image forming apparatus that perform image formation on a sheet using a recording material;

a sheet processing apparatus that execute sheet processing for binding a plurality of sheets using the recording material; and a memory that stores a history of the image formation and a history of the sheet processing, wherein the memory stores the history of the sheet processing for each of positions of the sheet processing.

2. The image forming system according to claim 1, wherein the history of the image formation comprises the number of sheets on which the image formation is performed, and wherein the history of the sheet processing comprises the number of sheets on which the sheet processing is performed.

3. The image forming system according to claim 1, wherein the history of the image formation comprises the number of sheets on which the image formation is performed, and wherein the history of the sheet processing comprises the number of times the sheet processing is performed.

4. The image forming system according to claim 1, wherein more recording material is used for the sheet processing when the position of the sheet processing is a second position than a first position.

5. The image forming system according to claim 1, further comprising a user interface that sets a binding width in the sheet processing, wherein the image forming system changes in how the history of the sheet processing is kept depending on the binding width set by the user interface.

6. The image forming system according to claim 1, wherein the memory changes in how the history of the sheet processing is kept depending on a size of sheets bound by the sheet processing.

7. The image forming system according to claim 1, further comprising a display that displays the history of the image formation and the history of the sheet processing stored in the memory.

8. The image forming system according to claim 1, further comprising a controller that calculates a remaining amount of the recording material based on the history of the image formation and the history of the sheet processing stored in the memory.

9. The image forming system according to claim 8, wherein the image forming system makes a notification about the remaining amount of the recording material calculated by the controller.

10. The image forming system according to claim 1, further comprising:

a controller, wherein the controller determines whether to execute the sheet processing based on the history of the sheet processing; and wherein the controller restricts, when it is determined by the controller not to execute the sheet processing, execution of the sheet processing.

11. The image forming system according to claim 10, wherein the image forming system makes, when it is determined by the controller not to execute the sheet processing, a notification that the sheet processing is not to be executed.

12. The image forming system according to claim 1, wherein the sheet processing apparatus executes the sheet processing for binding the plurality of sheets by heating and pressing the recording material applied to the sheets by the image forming apparatus.

13. The image forming system according to claim 1, wherein the recording material comprises a black recording material.

14. The image forming system according to claim 1, wherein the recording material comprises a toner.

15. A method for controlling an image forming system, the method comprising:

performing image formation on a sheet using a recording material;

executing sheet processing for binding a plurality of sheets using the recording material; and storing a history of the image formation and a history of the sheet processing, wherein the history of the sheet processing is stored for each of positions of the sheet processing.

16. A non-transitory computer-readable recording medium storing a program for causing a computer to execute a method for controlling an image forming system, the method comprising:

controlling an image forming unit to perform image formation on a sheet using a recording material;

causing a sheet processing unit to execute sheet processing for binding a plurality of sheets using the recording material; and storing a history of the image formation and a history of the sheet processing in a storage unit, wherein the history of the sheet processing is stored for each of positions of the sheet processing.

* * * * *